United States Patent [19]

Stanton

[11] Patent Number: 4,573,651

[45] Date of Patent: Mar. 4, 1986

[54] TORQUE ORIENTATION DEVICE

[76] Inventor: Austin N. Stanton, 3017 Stonehenge La., Carrollton, Tex. 75006

[21] Appl. No.: 562,737

[22] Filed: Dec. 19, 1983

[51] Int. Cl.[4] .............................................. B64G 1/20
[52] U.S. Cl. ...................................... 244/165; 74/5 R
[58] Field of Search ............... 244/164, 165, 170, 171; 74/5 R, 5.22

[56] References Cited

U.S. PATENT DOCUMENTS

| | | | |
|---|---|---|---|
| 2,991,659 | 7/1961 | Bowden | 74/5 R |
| 3,320,818 | 5/1967 | Magnus | 74/5.22 |
| 3,456,512 | 7/1969 | Schmidt | 74/5 |
| 3,493,194 | 2/1970 | Kurzhals | 244/165 |
| 3,526,795 | 9/1970 | Pecs | 244/165 |
| 3,591,108 | 7/1971 | Perkel et al. | 244/165 |
| 3,813,067 | 5/1974 | Mork | 244/165 |

OTHER PUBLICATIONS

Alfriend, K. T. & Lindberg, R. E. Geomagnetic Field Effects on the Design of a Magnetic Attitude Control System Jour.
Kraige, L. G. Ulman, D. A., Rectification of the Encke Perturbation Method as Applied to Rigid Body Rotational Motion.
Chen, J. & Kane, T. R. Slewing Maneuvers of Gyrostat Spacecraft Jour. Astronautical Sci., vol. XXVIII, No. 3, Jul.-Sep., 1980.
Levinson, David A. A Simple Computer Graphics Technique for Spacecraft Attitude Dynamics Simulations, Jour. Astronautical.
Junkins, J. L., Rajaram, S., Baracat, W. A. & Carrington, C. K. Precision Autonomous Satellite Attitude Control Using Momentum.
Skaar, S. B. & Kraige, L. G. Large-Angle Spacecraft Attitude Maneuvers Using an Optimal Reaction Wheel Power Criterion.
Kelley, Henry J., Cliff, Eugene M. & Lutze, Frederick H. Pursuit/Evasion in Orbit. Jour. Astronautical Sciences, vol. XXIX.
Gatland, Kenneth W. Prelude to the Space Age, Spaceflight, British Interplanetary Society, vol. 24, Nov. 11, 1982.
Borrowman, Gerald D. The Proximity Operations Module, Spaceflight, British Interplanetary Society, vol. 26, Jan., 1984.
"The Physics of Somersaulting and Twisting" Scientific American, Mar., 1980 by Cliff Frohlich.

Primary Examiner—Galen L. Barefoot
Attorney, Agent, or Firm—Richards, Harris, Medlock & Andrews

[57] ABSTRACT

A torque orientation device (10) selectively orients a space craft without the use of jets or the ejection of any material. Pedestals (12, 14) support a gimbal (16) which is selectively driven by a motor (20). The gimbal (16) includes a frame (24) which supports an axle (30), a motor (26) and a commutator (28). Mass members (36, 38) are driven about the axle (30) by the motor (26). The moment of inertia about the primary axle (18) of the gimbal (16) is a function of the angular position of the mass members (36, 38) about the axle (30). The motor (20) applies selective torque impulses at periods (T1, T2) to the primary axle (18) in synchronism with the angular position of the mass members (36, 38) about the axle (30). The resulting counter torque from the motor (20) is passed to the space craft to cause the space craft to rotate toward the desired angular position. If the device (10) is mounted in the cross axis of a larger gimbal, its main axis may be adjusted to any other angle to produce space craft rotation about any axis. A group of three of the torque orientation devices (10) mounted at orthogonal angles to each other provides three axis orientation control for the space craft.

13 Claims, 6 Drawing Figures

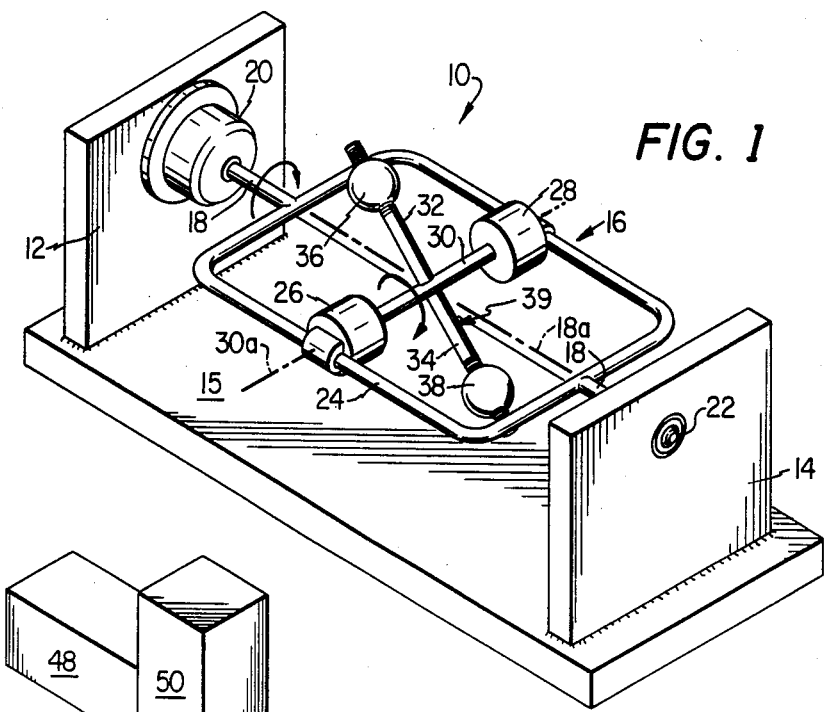
FIG. 1
FIG. 3
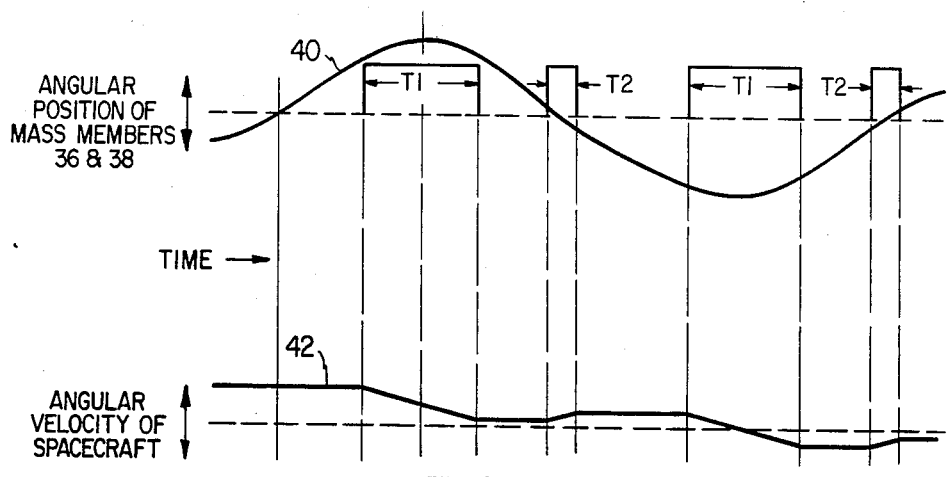
FIG. 2

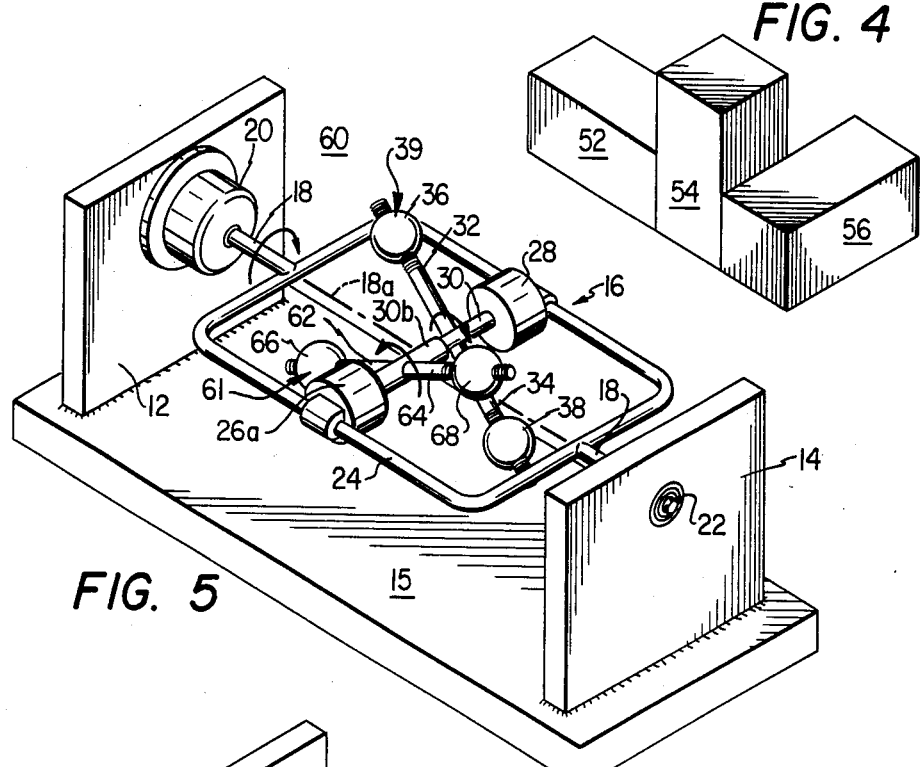
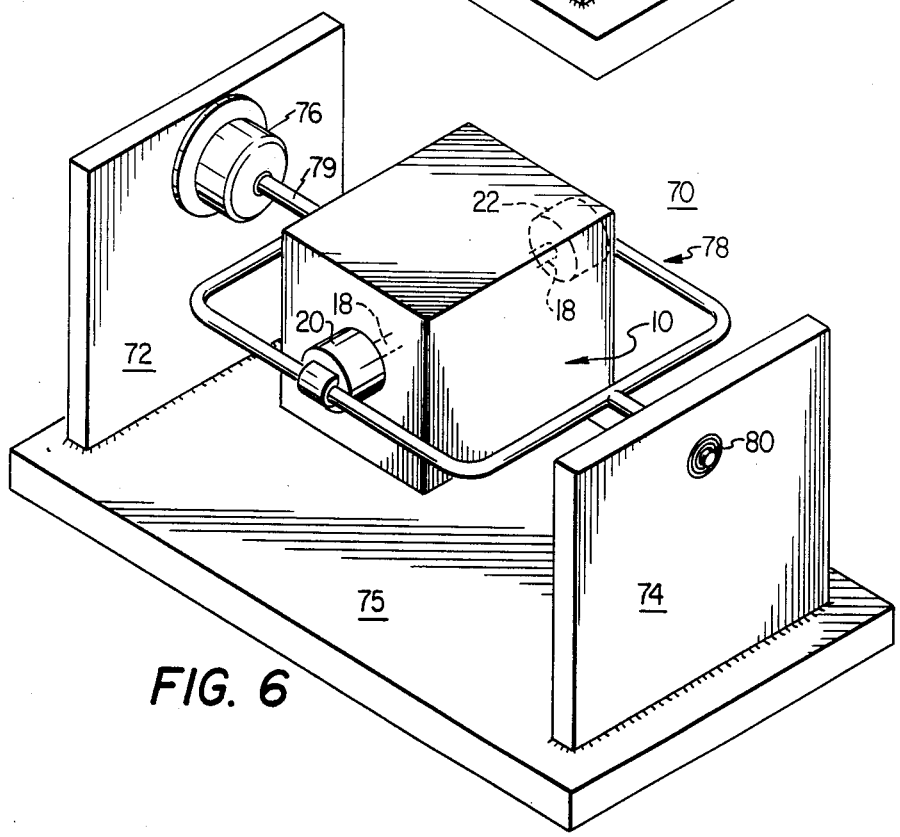

TORQUE ORIENTATION DEVICE

TECHNICAL FIELD

The present invention pertains to apparatus for controlling the orientation of space craft and in particular to such an apparatus which does not eject materials for producing forces.

BACKGROUND ART

There are numerous requirements for orienting space craft but space by its very nature offers no base from which to apply force. It has been the conventional practice to use small jets to accelerate materials and produce reaction forces to cause the space craft to be oriented. However, the ejection of such materials can produce debris in the vicinity of the space craft such that the debris interferes with the collection of reliable scientific information. The need to carry fuel for the jets adds to the weight penalty for the space craft which in turn increases the launch vehicle weight and cost.

Reaction engines of several types have been developed ranging from very small jets using evaporation of liquids or deliquescence of solids to larger liquid fuel chemical reaction yet. Various types of devices requiring acceleration of flywheels have also been developed, but these suffer from weight and ultimate strength of material limitations, as well as high speed bearing requirements. The cost and mechanical limitations of such devices have limited their usefulness. Radiation pressure applied to off-center panels has been considered, but this has proven to be too slow for most applications.

Therefore, there exists a need for an orientation device which can reliably and accurately orient a space craft without the need to eject materials while having a small number of high reliability components. Such a device should preferably be electrically powered rather than powered by means of stored chemical fuel.

SUMMARY OF THE INVENTION

A selected embodiment of the present invention comprises a torque orientation device for attitude control of a space craft. The device includes a frame which is mounted to the space craft and a gimbal which has the main axle thereof rotatably mounted to the frame and the second axle thereof normal to the main axle. A mass assembly is mounted for rotation about the second axle. The mass assembly is balanced and has oppositely opposed mass elements wherein the moment of inertia about the main axle is a function of the angular position of the mass assembly about the second axle. A motor is provided for driving the mass assembly about the second axle. A further motor is provided for selectively applying torque to the gimbal main axle to produce a countertorque on the frame for changing the attitude of the space craft.

In a further embodiment of the present invention, counter rotating mass assemblies are provided on the second axle to neutralize the effects caused by acceleration and deceleration of the masses.

In a still further embodiment of the present invention, a plurality of the above described devices are mounted orthogonally on the space craft to provide orientation control about a plurality of orthogonal axes.

BRIEF DESCRIPTION OF THE DRAWINGS

For a more complete understanding of the present invention and the advantages thereof, reference is now made to the following description taken in conjunction with the accompanying drawings in which:

FIG. 1 is a perspective illustration of a torque orientation device in accordance with the present invention wherein a single mass assembly is rotated within a gimbal;

FIG. 2 is a chart illustrating the torque supplied to the gimbal of the device in FIG. 1 and the resulting angular velocity of the space craft;

FIG. 3 is a schematic illustration showing a torque orientation system comprising two of the torque orientation devices shown in FIG. 1;

FIG. 4 is a schematic illustration showing a torque orientation system comprising three of the torque orientation devices as shown in FIG. 1;

FIG. 5 is a perspective illustration of a torque orientation device in accordance with the present invention wherein counter rotating mass assemblies are mounted within a gimbal mechanism; and FIG. 6 is a perspective illustration of a torque orientation device in accordance with the present invention wherein the device shown in FIG. 1 is mounted within a selectively driven gimbal mechanism.

DETAILED DESCRIPTION

The present invention comprises a device for orienting a vehicle in space by controlled torque applied about one or more axes of the vehicle. Rotation of the vehicle is produced by reaction with a rotor, having alternately and successively, two different moments of inertia. Power for the rotors can be supplied through solar cells thus eliminating the need for storing fuel material. There is further no ejected debris which could interfere with scientific measurements.

A basic embodiment of the present invention is illustrated in FIG. 1. A torque orientation device is generally represented by the reference numeral 10. Pedestals 12 and 14 are mounted on a plate 15 which together comprise a rigid frame that is attached to the space vehicle. A gimbal 16 has a main axle 18 for rotation about an axis 18a, the axle 18 rotatably supported by the pedestals 12 and 14. A first end of the axle 18 is connected to the pedestal 12 by a motor 20 which can selectively apply torque to the axle 18. The second end of the axle 18 is supported by the pedestal 14 by means of a bearing 22.

The gimbal 16 further includes a rectangular frame 24 which is connected at the center of the end sections thereof to the axle 18. A motor 26 is mounted at the center of one of the longitudinal elements of the frame 24. A commutator 28 is mounted on the opposite longitudinal member of the frame 24. A second axle 30 of the gimbal 16 is mounted between the motor 26 and the commutator 28 and rotates about an axis 30a. The axis 30a is normal to the axis 18a. Similar arms 32 and 34 extend outward from the center of the axle 30. Mass members 36 and 38 are connected respectively to the outboard ends of arms 32 and 34. The arms 32 and 34 together with the mass members 36 and 38 form a mass assembly 39 which is balanced about the axle 30.

Operation of the torque orientation device 10 is now described in reference to FIGS. 1 and 2. In FIG. 2 a line 40 represents the angular position of the mass assembly comprising arms 32 and 34 together with mass members 36 and 38 relative to the plane of frame 24 during one complete cycle of rotation. The arms 32 and 34 are at zero degrees when in the plane of frame 24. A line 42 shows the relative angular velocity of the space craft, not shown, with respect to space coordinates, as it rotates in attitude as a result of the torque supplied by the device 10.

The motor 20 applies torque selectively about the axis 18a. A first positive torque is shown in FIG. 2, line 40, applied during the time interval T1 in synchronism with the position of the mass assembly 39 while its moment of inertia relative to the axis 18a is a maximum. The positive torque produces negative angular acceleration for the space craft. The instantaneous value of the angular velocity is shown as line 42 in FIG. 2. For a succeeding portion of the cycle the space craft rotates at a constant angular velocity. The motor 20 then applies a second, negative torque during the period T2, when the moment of inertia of the mass assembly 39 about the axis 18a is a minimum. For every torque applied there is an equal and opposite torque applied to the pedestal 12 and thus to the space craft. The negative torque applied during the short period T2 restores the gimbal 16 to its original angular position with respect to the pedestal 12 and applies an infintesimal positive torque to the space craft through the pedestal 12. The torques are applied during periods T1 and T2 about the axis 18a in synchronism with the motion of the mass assembly 39 about the axis 30a. The angular position of mass assembly 39 is determined by the commutator 28 which supplies the appropriate timing to the motor 20. The torques applied during the periods T1 and T2 are produced for a sufficient number of cycles to achieve the desired angular velocity of the space craft. It should be understood that the angular velocity imparted by a single cycle of the mass assembly 39 to a massive space craft may be very small but the cycle is repeated many times, producing any required positive or negative angular velocity. Also, it should be understood that the procedure may be later reversed to reduce the angular velocity to zero.

The basic device 10 provides one axis of attitude control for a space craft. Two of the devices 10 may be installed on the space craft at right angles to each other. This is illustrated as devices 48 and 50 in FIG. 3. Each of the devices 48 and 50 is similar to the device 10 shown in FIG. 1. It is well known that proper application of sequenced torque pulses about two axes can produce any required orientation.

A three axis control system is illustrated in FIG. 4. Each of devices 52, 54 and 56 is similar to the device 10 shown in FIG. 1. However, the main axes of each of the devices 52, 54 and 56 are orthogonal to each other. This provides full, simultaneous three axis attitude control for the space craft.

A further embodiment of the present invention is illustrated in FIG. 5. A torque orientation device 60 has many common elements to device 10 shown in FIG. 1. The common elements have similar reference numerals. The difference between device 60 and device 10 is that device 60 has an additional mass assembly 61 comprising arms 62 and 64 and respective mass members 66 and 68 which rotate about a counter-rotating axle 30b. Axle 30b rotates about axis 30a. The arms 62 and 64 rotate in an opposite direction about the axle 30b relative to the arms 32 and 34 about axle 30. A gearmotor motor 26a drives both of the sets of masses 36, 38 and 66, 68 through axles 30 and 30b. The device 60 operates essentially the same as the device 10 but has the additional advantage that upon accelation of the masses 36, 38, 66 and 68 there is no counter torque applied through the pedestal 12 to the space craft. Thus, the mass members 36, 38, 66 and 68 can be accelerated and decelerated at any time without affecting the orientation of the space craft.

The device 60 can be applied as multiple units to achieve multiple degrees of control for a space craft. The device 60 can be used in the configuration shown in FIGS. 3 and 4 to achieve two and three axes of control as described above for device 10.

A still further embodiment of the present invention is illustrated in FIG. 6. A complete multi-axis torque orientation device 70 provides attitude control for all orientations and spins about any axis. The device 70 includes pedestals 72 and 74 which are mounted on a plate 75 to form a rigid frame. A motor 76 drives a gimbal 78 at a first end of its main axle 79. The gimbal 78 is supported at the opposite end of its main axle 79 through a bearing 80 by the pedestal 74. On the second axle of the gimbal 78 there is mounted the complete device 10, absent the pedestals 12 and 14, as shown in FIG. 1. Similar reference numerals are used for the illustrated elements.

The device 70 drives the gimbal 78, by means of motor 76, through any selected angular rotation and locks the gimbal 78 at that selected angle. The device 10 is then operated as described above to produce counter rotational forces. By use of the device 10 within the second gimbal 78, counter torque forces can be produced at any angular position thereby providing multiple axis control for the space craft.

The torque orientation device 60 can be substituted in place of the device 10 in the embodiment shown in FIG. 6 to achieve the same results but again with a reduction in the acceleration and deceleration forces present when the masses have a change in angular velocity.

There are numerous requirements for attitude control in a space craft. These include temperature control, spin control, docking orientation and star tracking. In most cases, relatively long periods of time are available to produce the required spin or re-orientation. As shown in FIG. 2, the torques applied to the space craft are frequent and the changes of angular velocity of the space craft are cumulative. Therefore, the devices of the present invention can be made very small in weight and dimensions and still provide the required orientation for space craft, even for those having a substantial mass.

Although several embodiments of the invention have been illustrated in the accompanying drawings and described in the foregoing Detailed Description, it will be understood that the invention is not limited to the embodiments disclosed, but is capable of numerous rearrangements, modifications and substitutions of parts and elements without departing from the scope of the invention.

I claim:

1. A torque orientation device for attitude control of a space craft, comprising:
    a frame mounted to said space craft;
    a gimbal having the main axle thereof rotatably mounted to said frame and the second axle thereof normal to said main axle;
    a mass assembly mounted for rotation about said second axle, said mass assembly having balanced and oppositely opposed mass elements, wherein the moment of inertia about said main axle is a function of the angular position of said mass assembly about said second axle;

means for driving said mass assembly about said second axle, and means connected to said frame for selectively applying torque about said gimbal main axle to produce a counter torque on said frame for changing the attitude of said space craft.

2. A torque orientation device as recited in claim 1 including a commutator connected to said second axle for measuring the angular position of said mass assembly.

3. A torque orientation device as recited in claim 1 wherein said mass assembly comprises two oppositely directed arms each having one end thereof connected to said second axle and further includes two mass members respectively connected to the outboard ends of said arms.

4. A torque orientation device for attitude control of a space craft, comprising:
- a frame mounted to said space craft;
- a gimbal having the main axle thereof rotatably mounted to said frame and the second axle thereof normal to said main axle;
- a pair of mass assemblies mounted for counter rotation about said second axle, each mass assembly having balanced and opposed mass elements, said mass assemblies passing concurrently parallel to said main axle, wherein the moment of inertia about said main axle is a function of the angular position of said mass assemblies about said second axle;
- means for driving said mass assemblies in opposite angular directions about said second axle, and
- means connected to said frame for selectively applying torque about said gimbal main axle to produce a counter torque on said frame for changing the attitude of said space craft.

5. A torque orientation device as recited in claim 4 including a commutator connected to said second axle for measuring the angular position of said mass assemblies.

6. A torque orientation device as recited in claim 4 wherein each of said mass assemblies comprises two oppositely directed arms, each having one end thereof connected to said second axle and further including four mass members respectively connected to the outboard ends of said arms.

7. A torque orientation system for multi-axis attitude control of a space craft, comprising:
- a plurality of orthogonally positioned devices, each comprising:
  - a frame mounted to said space craft;
  - a gimbal having the main axle thereof rotatably mounted to said frame and the second axle thereof normal to said main axle;
  - a mass assembly mounted for rotation about said second axle, said mass assembly having balanced and oppositely opposed mass elements, wherein the moment of inertia about said main axle is a function of the angular position of said mass assembly about said second axle;
  - means for driving said mass assembly about said second axle, and
  - means connected to said frame for selectively applying torque to said gimbal main axle to produce a counter torque on said frame for changing the attitude of said space craft.

8. A torque orientation device as recited in claim 7 including a commutator connected to each of said second axles for measuring the angular position of the corresponding mass assembly.

9. A torque orientation device as recited in claim 7 wherein each of said mass assemblies comprises two oppositely directed arms, each having one end thereof connected to said second axle and further including four mass members respectively connected to the outboard ends of said arms.

10. A torque orientation system for multi-axis attitude control of a space craft, comprising:
- a frame mounted to said space craft;
- a first gimbal having the main axle thereof rotatably mounted to said frame, and the second axle thereof mounted to said main axle;
- means connected to said frame for driving said second axle;
- a torque orientation device comprising:
  - a second gimbal having the primary axle thereof corresponding and connecting to the second axle of said first gimbal, said second gimbal having a second gimbal axle normal to said second gimbal main axle;
  - a first mass assembly mounted for rotation about said second gimbal second axle, said mass assembly having balanced and oppositely opposed mass elements wherein the moment of inertia about said second gimbal main axle is a function of the angular position of said mass assembly about said second gimbal second axle;
  - means for driving said first mass assembly about said second gimbal second axle; and
  - means connected to said first gimbal for selectively applying torque to said second gimbal main axle to produce a counter torque on said first gimal and therethrough to said frame for changing the attitude of said space craft.

11. A torque orientation system as recited in claim 10 including a commutator connected to said second gimbal second axle for measuring the angular position of said mass assembly.

12. A torque orientation system as recited in claim 10 wherein said first mass assembly comprises two oppositely directed arms each having one end thereof connected to said second gimbal second axle and further includes two mass members respectively connected to the outboard ends of said arms.

13. A torque orientation system as recited in claim 10 including a second mass assembly mounted for rotation about said second gimbal second axle in the opposite direction of rotation of said first mass assembly, said first and second mass assemblies rotating synchronously and concurrently parallel to said second gimbal second axle.

* * * * *

UNITED STATES PATENT AND TRADEMARK OFFICE
CERTIFICATE OF CORRECTION

PATENT NO. : 4,573,651
DATED : Mar. 4, 1986
INVENTOR(S) : Stanton

It is certified that error appears in the above-identified patent and that said Letters Patent is hereby corrected as shown below:

Column 1, line 25, "yet" should be --jet--.

Signed and Sealed this

Twenty-first Day of October, 1986

[SEAL]

Attest:

DONALD J. QUIGG

Attesting Officer

Commissioner of Patents and Trademarks